(12) United States Patent
Nieminen et al.

(10) Patent No.: US 12,716,030 B2
(45) Date of Patent: Aug. 25, 2026

(54) METHOD AND APPARATUS FOR TREATING A FEED BEFORE A QUENCH COLUMN

(71) Applicant: TEKNOLOGIAN TUTKIMUSKESKUS VTT OY, Espoo (FI)

(72) Inventors: Matti Nieminen, Vtt (FI); Christer Tolergård, Vtt (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 128 days.

(21) Appl. No.: 18/279,949

(22) PCT Filed: Mar. 4, 2022

(86) PCT No.: PCT/FI2022/050140
§ 371 (c)(1),
(2) Date: Sep. 1, 2023

(87) PCT Pub. No.: WO2022/184982
PCT Pub. Date: Sep. 9, 2022

(65) Prior Publication Data

US 2024/0158699 A1 May 16, 2024

(30) Foreign Application Priority Data

Mar. 5, 2021 (FI) ..................................... 20215244

(51) Int. Cl.
*C10G 1/10* (2006.01)
*C08J 11/14* (2006.01)
(Continued)

(52) U.S. Cl.
CPC ................. *C10G 1/10* (2013.01); *C08J 11/14* (2013.01); *C10G 9/002* (2013.01); *C10J 3/82* (2013.01);
(Continued)

(58) Field of Classification Search
None
See application file for complete search history.

(56) References Cited

U.S. PATENT DOCUMENTS 3,966,633 A 6/1976 Friedman
5,952,539 A 9/1999 Seimandi et al.
(Continued)

FOREIGN PATENT DOCUMENTS

CN 102703098 A 10/2012
JP H10273676 A 10/1998
(Continued)

OTHER PUBLICATIONS

International Search report for PCT/FI2022/050140, prepared by the European Patent Office, mailing date May 16, 2022, 4 pages.
(Continued)

*Primary Examiner* — In Suk C Bullock
*Assistant Examiner* — Alyssa L Cepluch
(74) *Attorney, Agent, or Firm* — Brooks Kushman P.C.

(57) ABSTRACT

A method and a process arrangement for treating a feed before a quench column in an integrated process, in which the integrated process comprises at least one gasifier for forming a gasifier flow, at least one cracking furnace for forming a cracker flow, at least one quench column for treating the feed comprising the gasifier flow and cracker flow and at least one transfer line to supply the feed to the quench column. The gasifier flow is cooled at least partly for killing chemical reactions after a gasification, the cracker flow is cooled at least partly after the cracking furnace, the gasifier flow is combined to the cracker flow before a transfer line valve of the transfer line to form the feed to the quench column, and temperature of the feed is controlled to a predetermined temperature of the transfer line before the quench column.

14 Claims, 4 Drawing Sheets

(51) Int. Cl.
*C10G 9/00* (2006.01)
*C10J 3/82* (2006.01)

(52) U.S. Cl.
CPC .... *C08J 2323/02* (2013.01); *C10J 2300/0946* (2013.01); *C10J 2300/1884* (2013.01)

(56) References Cited

U.S. PATENT DOCUMENTS

| | | | | |
|---|---|---|---|---|
| 2005/0038304 | A1 | 2/2005 | Van Egmond et al. | |
| 2009/0064581 | A1 | 3/2009 | Nielsen et al. | |
| 2009/0202403 | A1* | 8/2009 | Jimenez-Huyke | C01B 3/36 422/198 |
| 2011/0290637 | A1 | 12/2011 | Kumar et al. | |
| 2020/0399546 | A1* | 12/2020 | Van Willigenburg | C10G 69/06 |
| 2022/0195309 | A1* | 6/2022 | Uppili | C10G 1/002 |

FOREIGN PATENT DOCUMENTS

| | | | |
|---|---|---|---|
| JP | H11290810 | A | 10/1999 |
| JP | 2001098283 | A | 4/2001 |
| JP | 2007504292 | A | 3/2007 |
| WO | 2012068931 | A1 | 5/2012 |
| WO | 2020169888 | A1 | 8/2020 |
| WO | 2020252228 | A1 | 12/2020 |

OTHER PUBLICATIONS

Finnish Search Report prepared by the Finnish Patent and Registration Office for FI 20215244, dated Jan. 9, 2021.

Heat storage furnace cracking. Beijing Chemical Plant No. 3. Petrochemical Publishing House. Feb. 1974. 16 pages.

First Chinese Office Action for Chinese Patent Application No. 202280027657.X mailed Aug. 15, 2025. 38 pages.

First Japanese Office Action for Japanese Patent Application No. 2023551694 mailed Oct. 22, 2025. 8 pages.

* cited by examiner

METHOD AND APPARATUS FOR TREATING A FEED BEFORE A QUENCH COLUMN

CROSS-REFERENCE TO RELATED APPLICATION

This application is the U.S. national phase of PCT Application No. PCT/FI2022/050140 filed on Mar. 4, 2022, which claims priority to FI patent application No. 20215244 filed on Mar. 5, 2021, the disclosures of which are incorporated in their entirety by reference herein.

FIELD

The application relates to a method and a process arrangement for treating a feed before a quench column in an integrated process. Further, the application relates to a use of the method.

BACKGROUND

Known from the prior art is to produce olefins from fossil raw material by a cracking process, such as by a steam cracking process.

Further, it is known from the prior art that waste plastic is difficult to recycle and to utilize as raw material in new products. Mechanical recycling is the cheapest way to recycle the waste plastic. The mechanically recycled plastic is typically used in lower level applications.

OBJECTIVE

The objective is to solve the above problems. Further, the objective is to disclose a new type of method and process arrangement for treating a feed before a quench column in a cracking process. Further, the objective is to recover olefins from polyolefins and recycle plastics. Further, the objective is to improve an integrated process comprising the cracking unit and a gasifier unit.

SUMMARY

The method and process arrangement and use are characterized by what are presented in the claims.

In the method and process arrangement, a feed is treated before a quench column in an integrated process comprising at least a gasifier for forming a gasifier flow, a cracking furnace for forming a cracker flow and a quench column for treating the feed comprising the gasifier and cracker flows, and the gasifier flow is combined to the cracker flow to form the feed, and temperature of the feed is controlled to a predetermined temperature before the quench column.

BRIEF DESCRIPTION OF THE DRAWING

The accompanying drawings, which are included to provide a further understanding of the invention and constitute a part of this specification, illustrate some embodiments of the invention and together with the description help to explain the principles of the invention. In the drawings.

DETAILED DESCRIPTION

Figure 1:
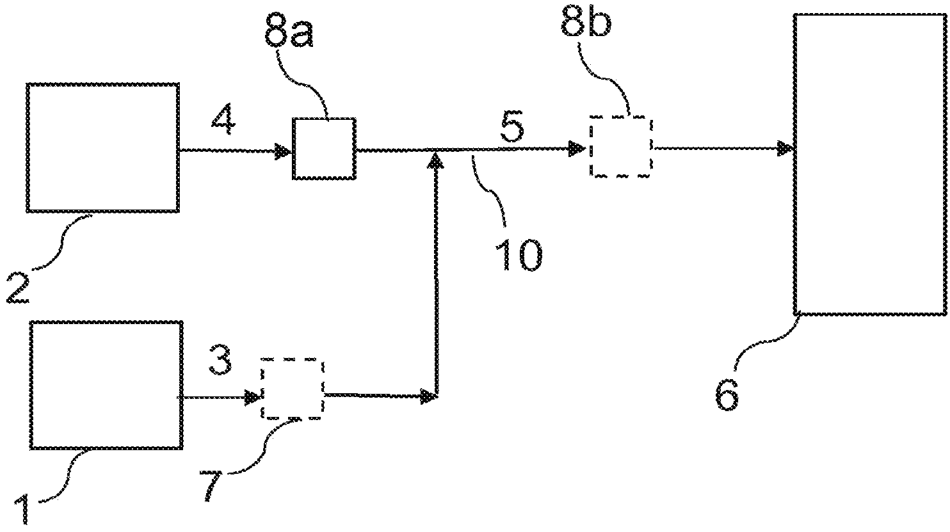
FIG. 1 is a flow chart illustration of a process according to one embodiment.

In the method a feed is treated before a quench column in an integrated process. The integrated process comprises at least one gasifier for forming a gasifier flow by a gasification, at least one cracking furnace, e.g. a steam cracking furnace, for forming a cracker flow, at least one quench column for treating the feed comprising the gasifier flow and cracker flow and at least one transfer line to supply the feed to the quench column. The method comprises cooling at least partly the gasifier flow for killing chemical reactions after the gasification, cooling at least partly the cracker flow after the cracking furnace, combining the gasifier flow to the cracker flow before a transfer line valve of the transfer line to form the feed to the quench column, and controlling temperature of the feed to a predetermined temperature of the transfer line before the quench column. The transfer line comprises at least one transfer line valve (11), and the gasifier flow (3) is combined with the cracker flow (4) before the transfer line valve in the transfer line.

In this context, the transfer line means any transfer line between any cracking furnace and any quench column. The transfer line can comprise at least one, or more, transfer line of the cracking furnace and a main transfer line. The cracker flows from the transfer lines of the cracking furnaces are collected to the main transfer line, and the formed feed is supplied to the quench column via the main transfer line. At least one of the transfer lines comprises at least one transfer line valve. In one embodiment, the transfer line valve is arranged before the main transfer line or between the transfer line of the cracking furnace and the main transfer line. The transfer line valve is a valve, which is used to isolate the cracking furnace from the main transfer line. In one embodiment, the transfer line valve is used to isolate the cracking furnace from the common transfer for decoking of furnace tubes and transfer line heat exchangers. When the gasifier flow is combined to the cracker flow before the transfer line valve, the gasifier can be integrated to a cracker unit easily and without problems in the whole cracking process. In one embodiment, the transfer line valve can be operated by opening and closing the valve. In one embodiment, a line between the gasifier and the transfer line comprises a valve, which can be opened and closed. Then, the line from the gasifier can be opened by opening the valve and the gasifier flow can be combined to the cracker flow, or alternatively, the valve can be closed and the gasifier flow is not combined with the cracker flow.

A process arrangement, i.e. an apparatus, for treating a feed before a quench column in connection with an integrated process comprises at least one means for cooling at least partly the gasifier flow for killing chemical reactions after the gasification, a cooling system for controlling temperature of the feed to a predetermined temperature of the transfer line before the quench column, and at least one connection point in the transfer line where the gasifier flow is combined to the cracker flow to form the feed to the quench column. The cooling system comprises at least one cooling device for cooling at least partly the cracker flow after the cracking furnace. The transfer line comprises at least one transfer line valve (11) and the connection point is located before the transfer line valve. In one embodiment, the connection point is located before the transfer line valve in the transfer line from the cracking furnace to the main transfer line. The integrated process comprises at least one gasifier for forming a gasifier flow, at least one cracking furnace for forming a cracker flow, at least one quench column for treating the feed comprising the gasifier flow and cracker flow and at least one transfer line to supply the feed to the quench column.

Some embodiments of the method and the process arrangement are shown in FIGS. 1-4.

In the integrated process, at least one gasifier unit comprising the gasifier or gasifiers is interconnected to the cracker unit, e.g. an olefin cracker unit. The cracker unit may be a steam cracker unit. The cracker unit comprises at least one cracking furnace, at least one quench column and at least one transfer line for supplying the feed to the quench column. In this context, the quench column means any quench column, for example a quench column in a main quench unit or fractionation unit, a first quench column in a main quench unit or fractionation unit, a main quench column, a main quench tower or a primary fractionation device of the fractionation unit. Further, the cracker unit comprises at least one cooling device to cool the gas of the cracking before the quench column. The connection of the gasifier unit is ideally executed to the main transfer line located in between the cracking furnaces and the quench column of the cracker unit. If such a connection is not available, it is possible to integrate the gasifier unit within the boundaries of the cracking furnace. The downstream facilities of the cracker can then separate the valuable components formed in the gasifier and thereby reduce the consumption of fresh feed to the cracker for any given olefin production level. Typically, the process conditions of the outlet of the gasifier must meet the requirements at the cracker unit. In one embodiment, pressure is typically low 1-3 bar (g) and temperature around 200-250° C. As the flow rate from the gasifier is very low compared to the cracker transfer line flow, cooling can be achieved by an internal mixing inside the transfer line, thereby not requiring additional quenching within the gasifier unit than killing the chemical reactions after the gasification. When the connection is done within the cracking furnace boundaries, a secondary cooling device, e.g. a secondary quench exchanger, of the cracking unit and a direct injection of the desired quench to control the temperature can be used to meet the required cracker conditions.

In this context, the gasification in a gasifier (1) means any gasification process by steam. The gasification is a process that converts starting material into gasification products, in this context into gasifier flow. This is achieved by treating the starting material at suitable temperatures, with a controlled amount of steam. In one embodiment, the gasification is carried out at 680-750° C. Any suitable gasifier may be used in the present process. In one embodiment, the gasifier is a vertical fluidized bed gasifier. In one embodiment, the fluidized bed is an inert bed in the gasifier.

The starting material in the gasification may be any suitable material. The gasifier flow may be formed from plastic waste comprising polyolefins and/or recycled plastics in the gasifier. In one embodiment, the plastic waste is recycled plastics. In this context, the recycled plastics means any plastic mixture which consists of one or more polymers. The recycled plastics may comprise polyolefins, e.g. polyethylene or polypropylene, and other polymers, and further other components, such as paper, cardboard and/or aluminium material. In one embodiment, the recycled plastics may comprise also PVC plastic.

In this context, the gasifier flow (3) means any flow, e.g. gas, product or the like, formed in the gasifier. In one embodiment, the gasifier flow is gas. The gasifier flow comprises olefins, e.g. ethylene and propylene, and the gasifier flow may be rich in olefins. Further, the gasifier flow may comprise aromatics, e.g. benzene and toluene, and other hydrocarbons, e.g. butadiene. Usually, the gasifier flow is a mixture of hydrocarbons.

In the cracking furnace (2), the cracker flow is formed. The reactions may be carried out, for example at 750-900° C. in the furnace, in which reaction time is short, e.g. below 1 second. For example, in the gasifier, the residence time may be below 10 seconds, in one embodiment 1-10 seconds and in one embodiment 3-10 seconds.

In this context, the cracker flow (4) means any flow, e.g. gas, product or the like formed in the cracking furnace (2). In one embodiment, the cracker flow is gas. The cracker flow comprises olefins, and typically the cracker flow is rich in olefins. Further, the cracker flow may comprise other hydrocarbons and/or components.

In one embodiment, the gasifier flow (3) is fed to the transfer line (10) and combined with the cracker flow (4) to form the feed (5) to the quench column (6). In one embodiment, the gasifier flow is combined to the cracker flow in the transfer line. In one embodiment, the transfer line is located between the cracking furnace and the quench column. The transfer line is arranged to transfer the cracker flow (4) and the feed (5) to the quench column.

The gasifier flow from the gasifier can be connected to the cracker flow at different process locations. For example, either within premises of the operating cracking furnace or directly to the transfer line connecting to the quench column. As the flow rate of the gasifier flow is low compared to the cracker flow, the cooling can be achieved by an inline mixing and thereby not requiring any additional cooling equipment for the gasifier flow at all.

In one embodiment, the process arrangement comprises one or more connection points. In one embodiment, the process arrangement comprises more than one connection points, and the desired connection point can be used to combine the gasifier flow to the cracker flow. In this context, the connection point may be any connection point, feed point, connection, coupling, tie-in or the like, by which the gasifier unit can be connected to the cracker unit. In one embodiment, the connection point is located in connection with the transfer line for combining the gasifier flow (3) to the cracker flow (4) in the transfer line before a transfer line valve (11) in the transfer line. In one embodiment, the connection point is in connection with the transfer line. In one embodiment, the connection point is after the cooling device (*8a*,*8b*) of the cracker flow, such as after a primary cooling device or after primary and secondary cooling devices.

In one embodiment, the gasifier flow (3) is combined to the cracker flow (4) to form the feed (5) and the feed (5) is cooled after the combining. In one embodiment, the gasifier flow (3) is combined to the cracker flow (4) to form the feed (5) without cooling of the feed (5) after the combining. In one embodiment, the gasifier flow (3) is combined to the cracker flow (4) after the first cooling device, e.g. a primary cooling device. In one embodiment, the formed feed is cooled after the first cooling device.

In one embodiment, the cooling system is arranged to fulfil the design temperature of the transfer line connected to the quench column (6). In one embodiment, temperature of the feed is arranged below 250° C. before the quench column. In one embodiment, the temperature of the feed is below 220° C. before the quench column. In one embodiment, the temperature of the feed is 200-250° C., in one embodiment 200-220° C., before the quench column In one embodiment, reactions are killed rapidly after the gasification by cooling the gasifier flow (3) to temperature of below 600° C., in one embodiment below 550° C., in order to stop chemical reactions. Then the yield of targeted products, e.g. light olefins, may be increased or maximised.

In one embodiment, reactions are killed after the cracking furnace by cooling the cracker flow (4) to temperature of below 600° C., in one embodiment 500-600° C., and in one embodiment 550-600° C., in order to stop chemical reactions. In one embodiment, the cracker flow (4) is cooled to temperature of 400-550° C., in one embodiment 400-500° C., before the combining. In one embodiment, the cracker flow (4) is cooled in few steps to temperature which is below 250° C. before the combining. In one embodiment, the cracker flow (4) is cooled to temperature of 200-250° C., in one embodiment 200-220° C., before the combining.

In one embodiment, the cooling system comprises at least one cooling device (8*a*,8*b*) for cooling the cracker flow (4) and/or the feed (5). In one embodiment, the cooling system comprises at least two cooling devices, e.g. primary and secondary cooling devices, for cooling the cracker flow (4) and/or the feed (5). In one embodiment, the cooling system comprises at least two cooling devices, e.g. primary and secondary cooling devices, for cooling the cracker flow (4) after the cracking furnace (2) and before the combining to a desired temperature. In one embodiment, the cooling system comprises at least one cooling device, e.g. a primary cooling device, for cooling the cracker flow (4) and at least one cooling device, e.g. a secondary cooling device, for cooling the feed (5) after the combining. In one embodiment, at least one cooling device is a quench exchanger. In one embodiment, the primary cooling device is a primary quench exchanger and the secondary cooling device is a secondary quench exchanger.

In one embodiment, the gasifier flow (3) is cooled before the combining. In one embodiment, the process arrangement comprises at least one cooling device (7), e.g. a water quench or heat exchanger, in the gasifier unit, before the combining, for cooling the gasifier flow after the gasifier (1) to a desired temperature. In one embodiment, the cooling device of the gasifier unit is a water quench. In one embodiment, the cooling device of the gasifier unit is a heat exchanger.

In one embodiment, the gasifier flow (3) is fed to the cracker flow at temperature of 400-550° C., in one embodiment 400-500° C. In one embodiment, the gasifier flow (3) is cooled to temperature of 400-600° C., in one embodiment 450-550° C., before the combining. In one embodiment, the gasifier flow (3) is cooled to temperature of 200-250° C. before the combining.

In one embodiment, the feed (5) is cooled after the combining.

In one embodiment, the gasifier flow (3) is combined to cracker flow (4) in the transfer line and the cooling of the gasifier flow can be achieved by an internal mixing inside the transfer line. The gasifier flow may be cooled by means of the cracker flow when the gasifier flow is combined to the cracker flow because the cracker flow is huge compared to the gasifier flow.

In one embodiment, the process arrangement comprises at least one cooling device (7) for cooling at least partly the gasifier flow (3) after the gasifier (1) and at least one cooling device (8*a*,8*b*) for cooling at least partly the cracker flow (4) after the steam cracker (2).

In one embodiment, the feed (5) or the cracker flow (4) is cooled by a direct quench (12) by injection of water and/or oil. In one embodiment, the direct injection of the quench is arranged to control the temperature in the feed or in the cracker flow. In one embodiment, the existing quench rate can be increased to compensate for the additional heat from the gasifier. In one embodiment, the process arrangement comprises at least one direct quench by which the feed (5) or the cracker flow (4) is cooled by injection of water and/or oil. Any suitable direct quench may be used. When gasifier (1) is connected within the cracking furnace (2), the furnace direct quench system will be able to also cool the gasifier flow, if the controlling temperature is measured from a downstream of the gasifier connection point. In one embodiment, the water and/or oil may be recirculated to the direct quench, e.g. from the quench column or another quench device. In one embodiment, the cracker flow and/or the feed is cooled by the direct quench after the cooling of the cracker flow and/or feed. In one embodiment, the injection of direct quench is arranged after the cooling devices of the cracker flow and/or the feed.

In one embodiment, other cracking furnaces (13) may be connected to the transfer line (10). In one embodiment, at least one additional cracking furnace, in which the cracker flow is cooled at least partly, may be connected to the transfer line after the cooling devices (8*a*,8*b*).

Possible contaminants of the gasifier flow may be diluted when the gasifier flow is combined to the cracker flow because the cracker flow is huge compared to the gasifier flow. Mass flow of the cracker flow may be typically 20+ times higher than mass flow of the gasifier flow. Thus, a contaminant removal is not obligatory. In one embodiment, the gasifier flow is filtered after the gasification. In one embodiment, the gasifier flow is treated by dry scrubbing and filtered. In one embodiment, temperature of the gasifier flow is 400-430° C. after the filtration.

After the quench column, the gas (9) may be compressed for a fractionation unit or treated in any other way.

The method and process arrangement are based on a continuous process.

In one embodiment, the method and process arrangement can be used in a production of olefins, aromatics, e.g. benzene, toluene or other aromatics, other hydrocarbons, polymers, polyolefins or the like, in a production of products from recycled plastic waste, in a recycling of polyolefins back to light olefins, or their combinations.

Thanks to the invention, the integration of the gasifier unit to an existing cracker unit can be improved and the integration can be performed easily without a shutdown of the whole cracking process. For example, an additional pre-quench is not needed to cool the gasifier flow. Further, this process allows some impurities in the produced gasifier flow.

The method and process arrangement offer a possibility to produce olefins and polyolefins easily, and energy- and cost-effectively. The present invention provides an industrially applicable, simple and affordable way to produce desired products from different starting materials. The method and process arrangement are easy and simple to realize in connection with production processes.

Further, the recycling of plastics can be improved by means of the invention. Recycled materials can be treated and utilized easily and effectively. In this process waste materials can be upgraded.

EXAMPLES

FIGS. 1-4 present some embodiments of the process for treating a feed before a quench column in connection with an integrated process.

The integrated process comprises at least one gasifier (1) for forming a gasifier flow (3), at least one cracking furnace (2) for forming a cracker flow (4), at least one quench column (6) for treating the feed (5) comprising the gasifier flow (3) and the cracker flow (4) and at least one transfer line (10) to supply the feed to the quench column.

The process arrangement of FIG. 1 comprises means for cooling at least partly the gasifier flow (3) for killing chemical reactions after the gasification in the gasifier (1). Further, the process arrangement comprises a cooling system for controlling temperature of the feed (5) to a predetermined temperature of the transfer line before the quench column (6). Further, the process arrangement comprises at least one connection point where the gasifier flow (3) is combined to the cracker flow (4) to form the feed (5) to the quench column. The cooling system comprises at least one cooling device (8*a*) for cooling at least partly the cracker flow (4) after the cracking furnace (2). The connection point is located between the cooling device in which the cracker flow is cooled at least partly after the cracking furnace and the quench column. In one embodiment, the gasifier flow (3) may be cooled by a cooling device (7) after the gasifier (1) and before the combining to the cracker flow (4). In one embodiment, the cracker flow (4) may be cooled by at least two cooling devices (8*a*, 8*b*) after the cracking furnace (2) and before the combining. In one embodiment, the cracker flow (4) may be cooled by a primary cooling device (8*a*) after the cracking furnace (2), and after that the gasifier flow (3) is combined to the cracker flow (4) to form the feed (5) and the feed is cooled by a secondary cooling device (8*b*). The temperature of the feed (5) is arranged below 250° C. before the quench column (6).

Figure 2:
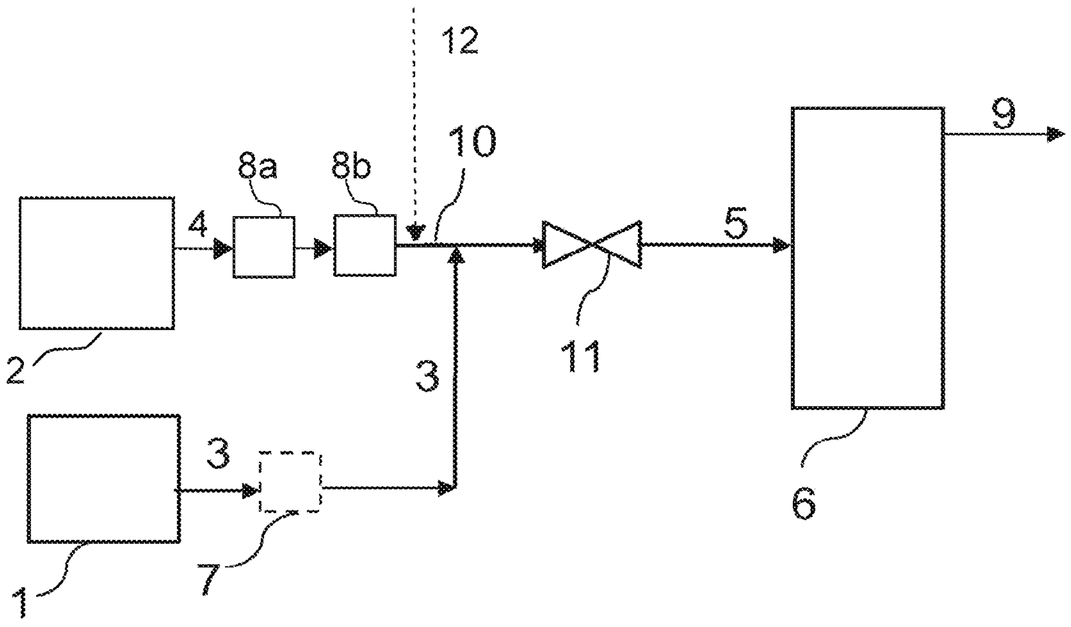
FIG. 2 is a flow chart illustration of a process according to another embodiment.

The process arrangement of FIG. 2 comprises means for cooling at least partly the gasifier flow (3) for killing chemical reactions after the gasification in the gasifier (1). The reactions are killed rapidly by cooling the gasifier flow (3) to temperature of below 600° C. in order to stop chemical reactions. Further, reactions of cracking are killed after the cracking furnace (2) by cooling the cracker flow (4) to temperature of below 600° C. in order to stop chemical reactions. Further, the process arrangement comprises a cooling system for controlling temperature of the feed (5) to a predetermined temperature of the transfer line before the quench column (6). Further, the process arrangement comprises at least one connection point where the gasifier flow (3) is combined to the cracker flow (4) to form the feed (5) to the quench column. The cooling system comprises at least two cooling devices (8*a*,8*b*), e.g. primary and secondary quench exchangers, for cooling the cracker flow (4) after the cracking furnace (2) to temperature of 200-250° C. The connection point is located after the cooling devices (8*a*,8*b*) in which the cracker flow is cooled. The gasifier flow (3) is combined to the cracker flow (4) in the transfer line (10). The transfer line comprises a transfer line valve (11), the gasifier flow (3) is combined to the cracker flow (4) before the transfer line valve (11). The gasifier flow (3) may be cooled by at least one cooling device (7), e.g. a heat exchanger and/or water quench, after the gasifier (1) and before the combining to the cracker flow (4) to a temperature of 200-250° C. Alternatively, the gasifier flow (3) is combined to cracker flow (4) in the transfer line and at least a part of the cooling of the gasifier flow can be achieved by an internal mixing inside the transfer line. Then the gasifier flow (3) may be fed to the cracker flow at temperature of 400-500° C. or at temperature which is below 400° C., e.g. below 250° C. Further, the process arrangement may comprise at least one direct quench (12) by which the cracker flow (4) or feed (5) is cooled by injection of water and/or oil. The temperature of the feed (5) is arranged below 250° C. before the quench column (6). A gas stream (9) is discharged from the quench column.

Figure 3:
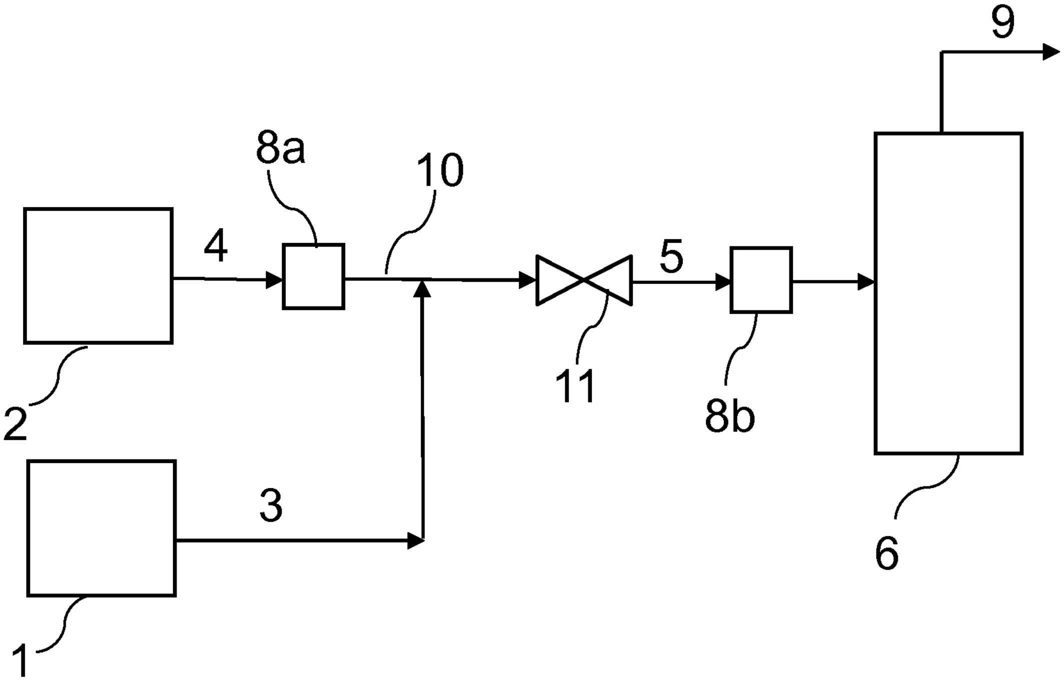
FIG. 3 is a flow chart illustration of a process according to another embodiment.

The process arrangement of FIG. 3 comprises means for cooling at least partly the gasifier flow (3) for killing chemical reactions after the gasification in the gasifier (1). The reactions are killed rapidly by cooling the gasifier flow (3) to temperature of below 600° C. in order to stop chemical reactions. Further, reactions of cracking are killed after the cracking furnace (2) by cooling the cracker flow (4) to temperature of below 600° C. in order to stop chemical reactions. Further, the process arrangement comprises a cooling system for controlling temperature of the feed (5) to a predetermined temperature of the transfer line before the quench column (6). Further, the process arrangement comprises at least one connection point where the gasifier flow (3) is combined to the cracker flow (4) to form the feed (5) to the quench column. The cooling system comprises at least two cooling devices (8*a*,8*b*). The cracker flow (4) is cooled after the cracking furnace (2) by a primary cooling device (8*a*), e.g. primary quench exchanger, to temperature of 400-500° C. After that the gasifier flow (3) is combined to the cracker flow (4) to form the feed (5). The gasifier flow (3) is fed to the cracker flow at temperature of 400-500° C. In one embodiment, the gasifier flow (3) may be cooled by a cooling device after the gasifier (1) and before the combining to the cracker flow (4). The formed feed (5) is cooled by a secondary cooling device (8*b*), e.g. e.g. secondary quench exchanger. The temperature of the feed (5) is arranged below 250° C. before the quench column (6). A gas stream (9) is discharged from the quench column. The transfer line comprises a transfer line valve (11), the gasifier flow (3) is combined to the cracker flow (4) before the transfer line valve (11).

Figure 4:
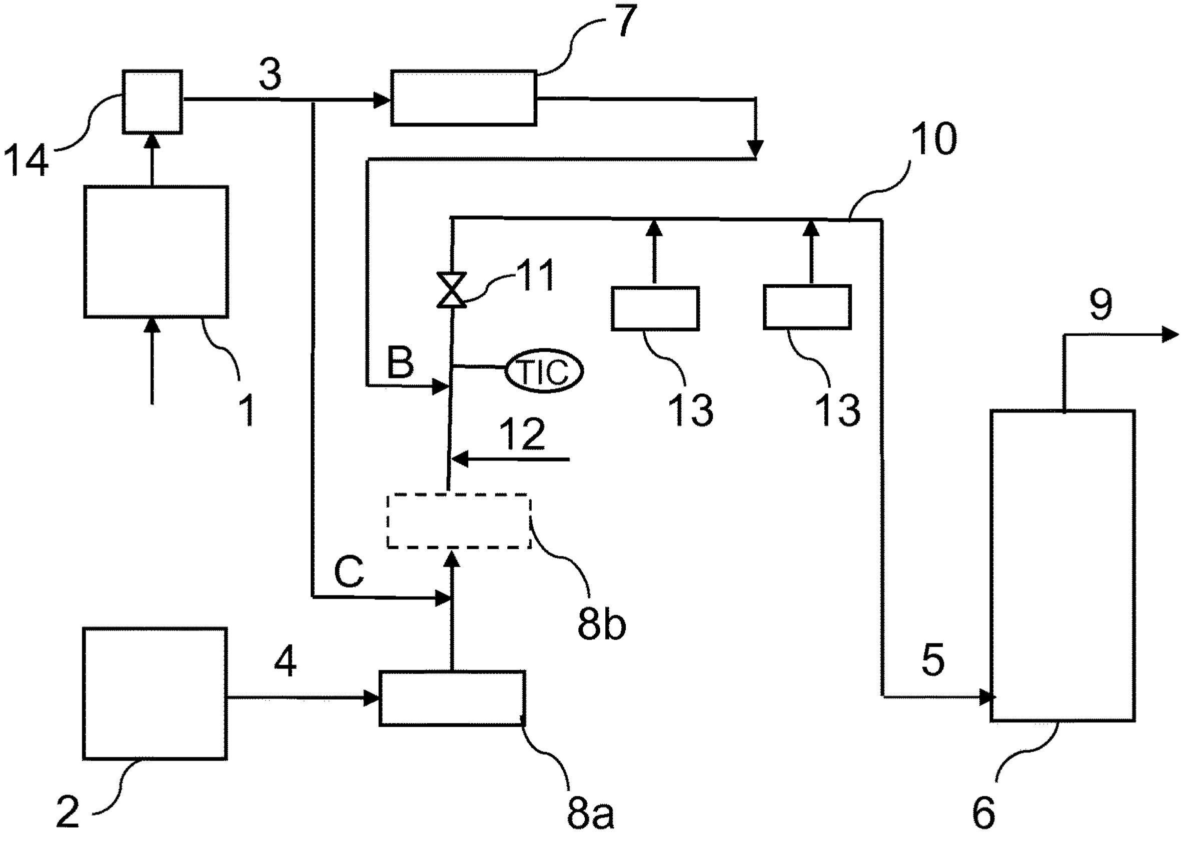
FIG. 4 is a flow chart illustration of a process according to another embodiment.

The process arrangement of FIG. 4 comprises means (14) for cooling at least partly the gasifier flow (3) for killing chemical reactions after the gasification in the gasifier (1). The reactions are killed rapidly by cooling the gasifier flow (3) to temperature of below 600° C. in order to stop chemical reactions. Further, reactions of cracking are killed after the cracking furnace (2) by cooling the cracker flow (4) to temperature of below 600° C. in order to stop chemical reactions. Further, the process arrangement comprises a cooling system for controlling temperature of the feed (5) to a predetermined temperature of the transfer line (10) before the quench column (6). Further, the process arrangement comprises two connection points, where the gasifier flow (3) can be combined to the cracker flow (4) to form the feed (5) to the quench column. The cooling system comprises at least one cooling device (8*a*) or alternatively two cooling devices (8*a*,8*b*), e.g. primary and secondary quench exchangers, for cooling the cracker flow (4) and/or feed (5) to temperature of 200-250° C. The connection points (B,C) are located in connection with the transfer line for combining the gasifier flow (3) to the cracker flow (4) in the main transfer line, after two cooling devices (8*a*, 8*b*) and before a transfer line valve (11) in the transfer line (B), or after the primary cooling device (8*a*) of the cracker flow and before a transfer line valve (11) in the transfer line (C). The gasifier flow (3) is combined to the cracker flow (4) in the desired connection point (B,C). The gasifier flow (3) may be cooled by at least one cooling device (7), e.g. a heat exchanger and/or water quench, after the gasifier (1) and before the combining to the cracker flow (4) to a temperature of 200-250° C. The gasifier flow (3) can be combined to cracker flow (4) in the transfer line before the transfer line valve (11) (B), e.g. to an upstream of the transfer line valve. In one embodiment, a part of the cooling of the gasifier flow can be achieved by an internal mixing inside the transfer line. Further, the gasifier flow (3) can be combined to cracker flow (4) at connection point C after the primary cooling device (8*a*) such that the cracker flow (4) is cooled after the cracking furnace (2) by the primary cooling device (8*a*) to temperature of 400-500° C. and after that the gasifier flow (3) is combined to the cracker flow (4) to form the feed (5). The formed feed (5) may be cooled by a secondary cooling device (8*b*). The gasifier flow (3) is fed to the cracker flow at temperature of 400-500° C. Further, the process arrangement comprises at least one direct quench (12) by which the cracker flow (4) or feed (5) is cooled by injection of water and/or oil. Another cracking furnace (13) in which the cracker flow has been cooled at least partly may be connected to the transfer line (10) after the cooling devices (8*a*,8*b*). The temperature of the feed (5) is arranged below 250° C. before the quench column (6). A gas stream (9) is discharged from the quench column.

Any suitable devices and equipments can be used in the process of these examples.

The method and process arrangement are suitable in different embodiments for producing olefins, polyolefins and other hydrocarbons from different starting materials.

The invention is not limited merely to the examples referred to above; instead many variations are possible within the scope of the inventive idea defined by the claims.

The invention claimed is:

1. A method for forming a feed supplied to a quench column via a main transfer line, wherein the main transfer line is connected to at least one other transfer line via a transfer line valve that is arranged between the at least one other transfer line and the main transfer line, the method comprising:

gasifying recycled plastics in a gasifier to form a gasifier flow, cooling the gasifier flow to stop chemical reactions after the gasification, cracking a cracker feed in a cracking furnace of a cracking unit to form a cracker flow, wherein the cracking unit is isolated from the main transfer line by the transfer line valve, cooling the cracker flow after the cracking furnace, combining the gasifier flow to the cracker flow in the at least one other transfer line, wherein the combining forms the feed to the quench column, controlling temperature of the feed to a predetermined temperature before the quench column, supplying the feed to the quench column via the main transfer line while the transfer line valve is opened, and quenching the feed in the quench column and discharging a gas stream from the quench column.

2. The method according to claim 1, wherein the predetermined temperature of the feed is below 250° C.

3. The method according to claim 1, further comprising cooling the feed after the combining.

4. The method according to claim 1, further comprising cooling the gasifier flow before the combining.

5. The method according to claim 1, wherein the gasifier flow at has a temperature of 400-500° C. when combined to the cracker flow.

6. The method according to claim 1, comprising cooling the gasifier flow to temperature of 200-250° C. before the combining.

7. The method according to claim 1, comprising cooling the cracker flow to temperature of 400-500° C. before the combining.

8. The method according to claim 1, comprising cooling the cracker flow to temperature of 200-250° C. before the combining.

9. The method according to claim 1, further comprising cooling the feed or the cracker flow by direct quench comprising injection of water and/or oil.

10. A process arrangement for forming a feed supplied to a quench column via a main transfer line, wherein the main transfer line is connected to at least one other transfer line via a transfer line valve that is arranged between the at least one other transfer line and the main transfer line, the process arrangement comprising:

a cracking unit including a cracking furnace and a gasifier that is integrated into the cracking unit, wherein the gasifier is configured to gasify recycled plastics by a gasification to form a gasifier flow and the cracking unit is configured to form a cracker flow, a cooling system comprising at least one means for cooling the gasifier flow for to stop chemical reactions after the gasification and at least one cooling device for cooling the cracker flow after the cracking furnace, wherein the cooling system is for controlling temperature of the feed to a predetermined temperature of the main transfer line before a quench column, at least one connection point in the at least one other transfer line, wherein the gasifier flow is combined to the cracker flow at the at least one connection point, and wherein the at least one connection point is before the transfer line valve, and a quench column connected to the main transfer line, wherein the cracking unit is isolated from the main transfer line by the transfer line valve, and wherein the quench column receives the feed via the main transfer line while the transfer line valve is opened and discharges a gas stream.

11. The process arrangement according to claim 10, wherein the cooling system comprises at least one cooling device for cooling the feed.

12. The process arrangement according to claim 10, wherein the cooling system comprises at least two cooling devices for cooling the cracker flow before the combining.

13. The process arrangement according to claim 10, wherein the cooling system comprises at least one cooling device for cooling the cracker flow and at least one cooling device for cooling the feed.

14. The process arrangement according to claim 10, wherein the process arrangement further comprises at least one direct quench which cools the feed or the cracker flow by injection of water and/or oil.

* * * * *